United States Patent
Zhou et al.

(10) Patent No.: US 10,663,778 B2
(45) Date of Patent: May 26, 2020

(54) LIQUID CRYSTAL DISPLAY AND DISPLAY DEVICE

(71) Applicant: BOE TECHNOLOGY GROUP CO., LTD., Beijing (CN)

(72) Inventors: Chengqi Zhou, Beijing (CN); Hong Wang, Beijing (CN); Yifang Chu, Beijing (CN); Chulgyu Jung, Beijing (CN); Shou Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 319 days.

(21) Appl. No.: 15/216,629

(22) Filed: Jul. 21, 2016

(65) Prior Publication Data
US 2017/0205652 A1    Jul. 20, 2017

(30) Foreign Application Priority Data

Jan. 15, 2016   (CN) .......................... 2016 1 0028289

(51) Int. Cl.
*G02F 1/133*  (2006.01)
*G09G 3/34*   (2006.01)
(Continued)

(52) U.S. Cl.
CPC ....... *G02F 1/13318* (2013.01); *G09G 3/3426* (2013.01); *H05B 45/10* (2020.01);
(Continued)

(58) Field of Classification Search
CPC ............ G06F 1/13318; G02F 1/13318; G09G 2360/144; G06G 2360/16
See application file for complete search history.

(56) References Cited

U.S. PATENT DOCUMENTS

| 2004/0245438 A1* | 12/2004 | Payne ................... G06F 3/0412 250/221 |
| 2012/0044224 A1* | 2/2012 | Michisaka ........... G09G 3/3426 345/207 |
| 2015/0015828 A1* | 1/2015 | Kim .................... G02F 1/13318 349/68 |

FOREIGN PATENT DOCUMENTS

| CN | 101369418 A | 2/2009 |
| CN | 102456317 A | 5/2012 |

(Continued)

OTHER PUBLICATIONS

Office Action in Chinese Application No. 201610028289.7 dated Aug. 2, 2017, with English translation.

*Primary Examiner* — Kent W Chang
*Assistant Examiner* — Chayce R Bibbee
(74) *Attorney, Agent, or Firm* — Womble Bond Dickinson (US) LLP

(57) ABSTRACT

This disclosure relates to a liquid crystal display and a display device. A plurality of photosensitive detectors is arranged in the frame region of the liquid crystal display panel. Light intensity distribution in the display region is estimated by a light intensity estimation module based on the light intensity detected by each photosensitive detector. Light intensity in a position corresponding to each light emitting pixel of the backlight source is determined based on the light intensity distribution in the display region estimated by the light intensity estimation module. Depending on the determined light intensity in a position corresponding to each light emitting pixel of the backlight source, luminance of the light emitting pixel in this corresponding position is controlled by a backlight driving circuit.

14 Claims, 3 Drawing Sheets

(51) Int. Cl.
*H05B 45/10* (2020.01)
*H05B 47/11* (2020.01)
(52) U.S. Cl.
CPC ....... *H05B 47/11* (2020.01); *G09G 2360/144* (2013.01); *G09G 2360/16* (2013.01)

(56) References Cited

FOREIGN PATENT DOCUMENTS

| CN | 203232682 U | 10/2013 |
| CN | 203733451 U | 7/2014 |

\* cited by examiner

LIQUID CRYSTAL DISPLAY AND DISPLAY DEVICE

CROSS REFERENCE TO RELATED APPLICATIONS

This application claims the benefit of Chinese patent application No. 201610028289.7 filed on Jan. 15, 2016, which is incorporated by reference in its entirety herein.

FIELD

This disclosure relates to the field of display technologies, and in particular to a liquid crystal display and a display device.

BACKGROUND ART

A liquid crystal display is a passive light emitting device and composed of a liquid crystal display panel and a backlight source, wherein the display luminance of the liquid crystal display panel is determined by the luminance of the backlight source. Most existing liquid crystal displays have a fixed luminance during display, and as a result, when the light intensity of an ambient light is high, the display effect is poor or even unsuitable to be viewed.

In order to improve the adaptivity of a liquid crystal display to the ambient light, the existing liquid crystal displays are provided peripherally with an optical sensor for detecting changes in the light intensity of the ambient light so as to control the brightness of the backlight source depending on the detected changes in the light intensity of the ambient light. For example, when the light intensity of the ambient light is higher than a threshold, luminance of the backlight source can be turned up, and when the light intensity of the ambient light is lower than a threshold, luminance of the backlight source can be turned down. However, such a liquid crystal display may have a problem. When the liquid crystal display panel has a very large screen, it is possible that the screen is only locally irradiated by intense light. In this case, it is impossible to adjust only the luminance of the backlight source corresponding to this region. Therefore, the image quality of the region irradiated by intense light in the screen will be severely affected, or even cannot be normally viewed.

SUMMARY

To this end, embodiments of this disclosure provide a liquid crystal display and a display device for adjusting each light emitting pixel of a backlight source depending on changes in the light intensity of an ambient light.

The embodiments of this disclosure provide a liquid crystal display, comprising: a liquid crystal display panel, a backlight source provided with a plurality of light emitting pixels arranged in a matrix, and a backlight driving circuit for driving the backlight source to emit light. The liquid crystal display panel comprises a display region and a frame region surrounding the display region. The liquid crystal display further comprises: a plurality of photosensitive detectors located in the frame region and a light intensity estimation module. The photosensitive detectors are used for detecting light intensities of the ambient light in positions where they are located. The light intensity estimation module is used for estimating light intensity distribution in the display region based on the light intensity detected by each of the photosensitive detectors, and determining light intensity in a position corresponding to each light emitting pixel of the backlight source based on the estimated light intensity distribution in the display region. The backlight driving circuit is further used for, based on the determined light intensity in a position corresponding to each light emitting pixel of the backlight source, adjusting luminance of the light emitting pixel in this corresponding position.

Optionally, in the liquid crystal display provided by the embodiments of this disclosure, the light intensity estimation module is connected between each of the photosensitive detectors and the backlight driving circuit.

Optionally, in the liquid crystal display provided by the embodiments of this disclosure, the backlight driving circuit is used for: comparing the light intensity in a position corresponding to each light emitting pixel of the backlight source in the display region with a first light intensity threshold; and if the light intensity in a position corresponding to the light emitting pixel is greater than the first light intensity threshold, increasing the luminance of the light emitting pixel in this corresponding position.

Optionally, in the liquid crystal display provided by the embodiments of this disclosure, the backlight driving circuit is further used for: comparing the light intensity in a position corresponding to each light emitting pixel of the backlight source in the display region with a second light intensity threshold, wherein the second light intensity threshold is smaller than the first light intensity threshold; and if the light intensity in a position corresponding to the light emitting pixel is smaller than the second light intensity threshold, decreasing the luminance of the light emitting pixel in this corresponding position.

Optionally, in the liquid crystal display provided by the embodiments of this disclosure, the display region of the liquid crystal display panel is rectangular. The frame region comprises a first sub-region and a second sub-region extending along a first direction, as well as a third sub-region and a fourth sub-region extending along a second direction, each sub-region being distributed with at least n photosensitive detectors, wherein n is an integer greater than 2.

Optionally, in the liquid crystal display provided by the embodiments of this disclosure, the light intensity estimation module comprises: a first calculation unit for estimating light intensity distribution in a corresponding sub-region of the frame region based on positions and light intensities of the n photosensitive detectors in each sub-region of the frame region; a second calculation unit for estimating light intensity distribution in the display region based on the light intensity distribution in each sub-region of the frame region; and a determination unit for determining light intensity in a position corresponding to each light emitting pixel of the backlight source depending on the estimated light intensity distribution in the display region.

Optionally, in the liquid crystal display provided by the embodiments of this disclosure, the first calculation unit is used for: estimating light intensity distribution of the sub-regions along the first direction in the frame region according to formula $$f_k(x) = \sum_{i=1}^{n} a_{ki} x^{n-i},$$

wherein k=1 or 2, $f_1(x)$ indicates light intensity of the first sub-region in a position x along the first direction, coefficient $a_{1i}$ being calculated by substituting positions and light intensities of the n photosensitive detectors in the first sub-region into formula $$f_1(x) = \sum_{i=1}^{n} a_{1i} x^{n-i},$$

and $f_2(x)$ indicates light intensity of the second sub-region in the position x along the first direction, coefficient $a_{2i}$ being calculated by substituting positions and light intensities of the n photosensitive detectors in the second sub-region into formula $$f_2(x) = \sum_{i=1}^{n} a_{2i} x^{n-i};$$

and estimating light intensity distribution of the sub-regions along the second direction in the frame region according to formula $$f_k(y) = \sum_{i=1}^{n} b_{ki} y^{n-i},$$

wherein k=1 or 2, $f_1(y)$ indicates light intensity of the third sub-region in a position y along the second direction, coefficient $b_{1i}$ being calculated by substituting positions and light intensities of the n photosensitive detectors in the third sub-region into formula $$f_1(y) = \sum_{i=1}^{n} b_{1i} y^{n-i},$$

and $f_2(y)$ indicates light intensity of the fourth sub-region in the position y along the second direction, coefficient $b_{2i}$ being calculated by substituting positions and light intensities of the n photosensitive detectors in the fourth sub-region into formula $$f_2(y) = \sum_{i=1}^{n} b_{2i} y^{n-i}.$$

Optionally, in the liquid crystal display provided by the embodiments of this disclosure, the second calculation unit is used for: estimating light intensity distribution in the display region according to a set of formulas as follows based on the light intensity distribution of each sub-region in the frame region:

$$f(x, y) = \mu f(x) + (1 - \mu) f(y)$$

$$f(y) = \frac{d_1}{d} f_1(y) + \frac{d_2}{d} f_2(y)$$

$$f(x) = \frac{l_1}{l} f_1(x) + \frac{l_2}{l} f_2(x)$$

$$\text{when } a < b, \mu = \frac{1}{2} e^{(a-b)}$$

$$\text{when } a > b, \mu = 1 - \frac{1}{2} e^{(b-a)}$$

wherein, d indicates a width of the display region along the first direction, $d_1$ indicates a distance from the position x along the first direction to the third sub-region, $d_2$ indicates a distance from the position x along the first direction to the fourth sub-region, l indicates a width of the display region along the second direction, $l_1$ indicates a distance from the position y along the second direction to the first sub-region, $l_2$ indicates a distance from the position y along the second direction to the second sub-region, a indicates the greater of $a_{11}$ and $a_{21}$, and b indicates the greater of $b_{11}$ and $b_{21}$.

Optionally, in the liquid crystal display provided by the embodiments of this disclosure, each sub-region is distributed with three photosensitive detectors.

Optionally, in the liquid crystal display provided by the embodiments of this disclosure, the three photosensitive detectors in each sub-region are located respectively on both ends and in the middle of the sub-region.

Correspondingly, the embodiments of this disclosure further provide a display device comprising any of the liquid crystal displays provided by the embodiments of this disclosure.

In the liquid crystal display and the display device provided by the embodiments of this disclosure, a plurality of photosensitive detectors are arranged in the frame region of the liquid crystal display panel. Light intensity distribution in the display region is estimated by a light intensity estimation module based on the light intensity detected by each photosensitive detector. Light intensity in a position corresponding to each light emitting pixel of the backlight source is determined based on the light intensity distribution in the display region estimated by the light intensity estimation module. Depending on the determined light intensity in a position corresponding to each light emitting pixel of the backlight source, luminance of the light emitting pixel in this corresponding position is controlled by a backlight driving circuit. In this way, when the ambient light irradiates onto the liquid crystal display panel with different intensities, even if the light intensities received by each zone of the display region are different, the backlight driving circuit can adjust luminance distribution of the backlight source based on the light intensity distribution of the display region, thereby reducing influence of the ambient light on the display effect.

DETAILED DESCRIPTION OF EMBODIMENTS

Examples of the liquid crystal display and display device provided by the embodiments of this disclosure shall be described in detail with reference to the drawings.

Figure 1:
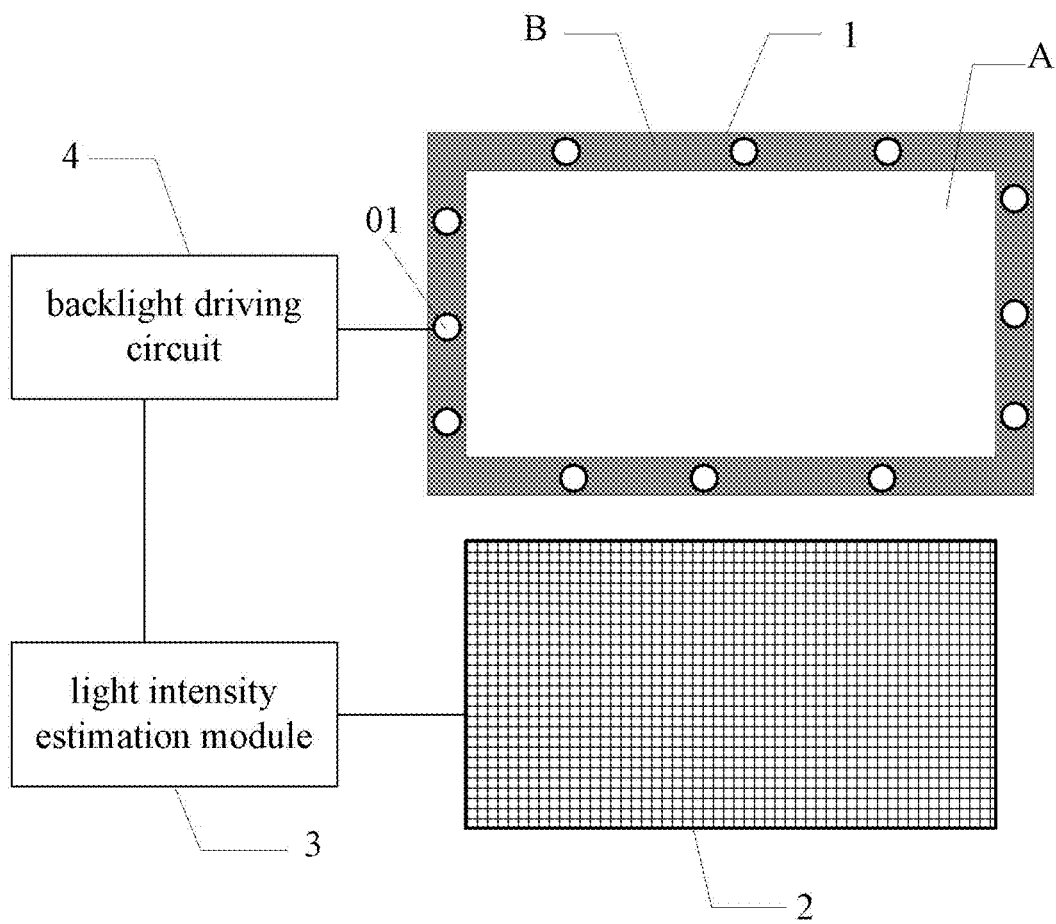
FIG. 1 is a schematic structural view of a liquid crystal display provided by the embodiments of this disclosure.

As shown in FIG. 1, the embodiments of this disclosure provide a liquid crystal display, comprising: a liquid crystal display panel 1, a backlight source 2 provided with a plurality of light emitting pixels arranged in a matrix, and a backlight driving circuit 3 for driving the backlight source 2 to emit light. The liquid crystal display panel 1 comprises a display region A and a frame region B surrounding the display region A. The liquid crystal display further comprises: a plurality of photosensitive detectors 01 located in the frame region B, and a light intensity estimation module 4 optionally connected between each photosensitive detector 01 and the backlight driving circuit 3. The photosensitive detectors 01 are used for detecting light intensities of the ambient light in positions where they are located. The light intensity estimation module 4 is used for estimating light intensity distribution in the display region A based on the light intensity detected by each photosensitive detector 01, and determining light intensity in a position corresponding to each light emitting pixel of the backlight source 2 based on the estimated light intensity distribution in the display region A. The backlight driving circuit 3 is further used for, based on the determined light intensity in a position corresponding to each light emitting pixel of the backlight source 2, adjusting luminance of the light emitting pixel in this corresponding position.

In the liquid crystal display provided by the embodiments of this disclosure, a plurality of photosensitive detectors are arranged in the frame region of the liquid crystal display panel. Light intensity distribution in the display region is estimated by a light intensity estimation module based on the light intensity detected by each photosensitive detector. Light intensity in a position corresponding to each light emitting pixel of the backlight source is determined based on the light intensity distribution in the display region estimated by the light intensity estimation module. Depending on the determined light intensity in a position corresponding to each light emitting pixel of the backlight source, luminance of the light emitting pixel in this corresponding position is controlled by a backlight driving circuit. In this way, when the ambient light irradiates onto the liquid crystal display panel with different intensities, even if the light intensities received by each zone of the display region are different, the backlight driving circuit can adjust luminance distribution of the backlight source based on the light intensity distribution of the display region, thereby reducing influence of the ambient light on the display effect.

In the liquid crystal display provided by the embodiments of this disclosure, the backlight driving circuit is specifically used for: comparing the light intensity in a position corresponding to each light emitting pixel of the backlight source in the display region with a first light intensity threshold; and if the light intensity in a position corresponding to the light emitting pixel is greater than the first light intensity threshold, increasing the luminance of the light emitting pixel in this corresponding position.

Specifically, in order to save energy, in the liquid crystal display provided by the embodiments of this disclosure, the backlight driving circuit is further used for: comparing the light intensity in a position corresponding to each light emitting pixel of the backlight source in the display region with a second light intensity threshold, wherein the second light intensity threshold is smaller than the first light intensity threshold; and if the light intensity in a position corresponding to the light emitting pixel is smaller than the second light intensity threshold, decreasing the luminance of the light emitting pixel in this corresponding position.

In specific embodiments, the first light intensity threshold and the second light intensity threshold can be obtained from experience. The first light intensity threshold generally refers to a value above which the light intensity of the ambient light will influence the display effect. The second light intensity threshold generally refers to a value below which the light intensity of the ambient light will have little influence on the display effect.

Figure 2:
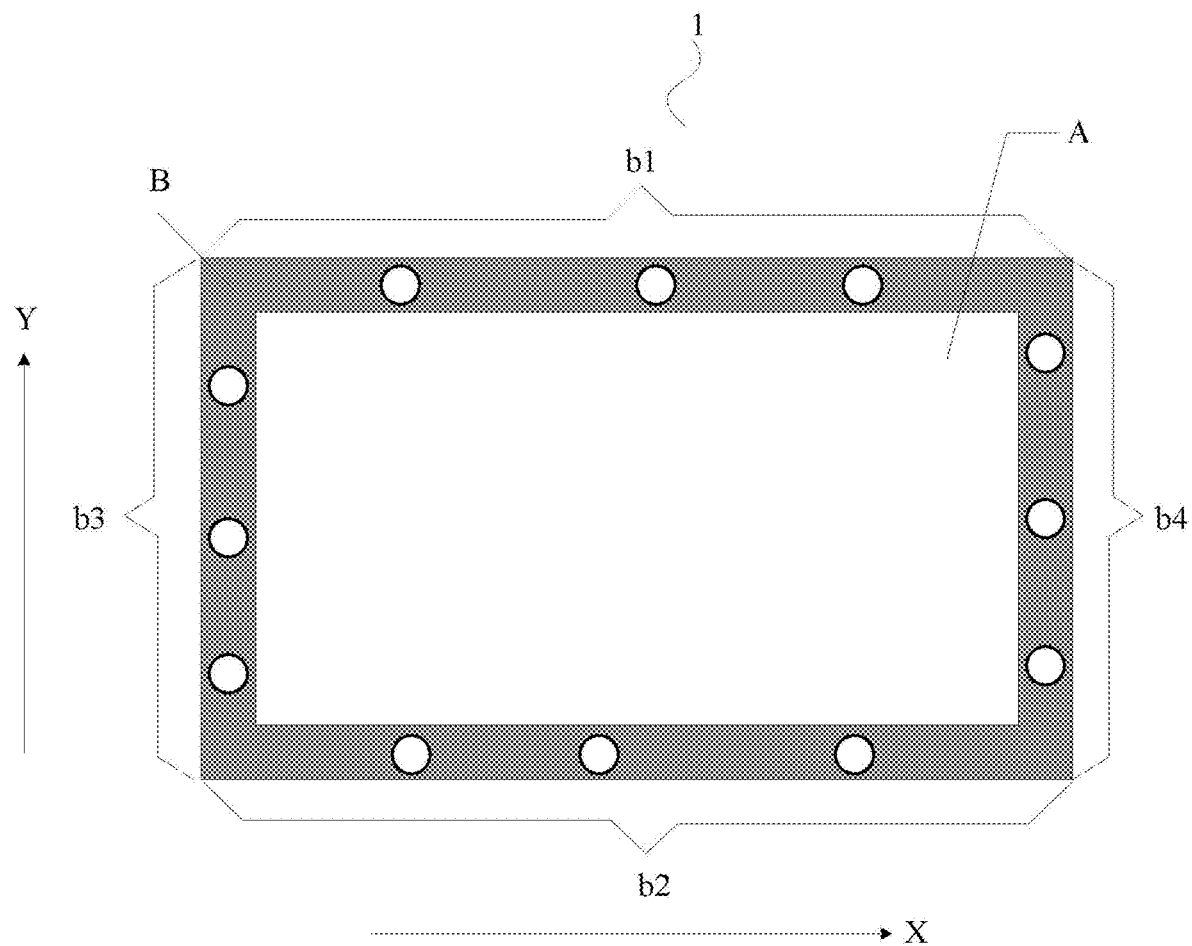
FIG. 2 is a schematic distribution view of photosensitive detectors in a liquid crystal display panel provided by the embodiments of this disclosure.

In specific embodiments, as shown in FIG. 2, the display region A of the liquid crystal display panel 1 is generally rectangular. The frame region B comprises a first sub-region b1 and a second sub-region b2 extending along a first direction X, as well as a third sub-region b3 and a fourth sub-region b4 extending along a second direction Y, each sub-region being distributed with at least n photosensitive detectors 01, wherein n is an integer greater than 2.

Optionally, in the liquid crystal display provided by the embodiments of this disclosure, the light intensity estimation module specifically comprises: a first calculation unit for estimating light intensity distribution in a corresponding sub-region of the frame region based on positions and light intensities of the n photosensitive detectors in each sub-region of the frame region; a second calculation unit for estimating light intensity distribution in the display region based on the light intensity distribution of each sub-region in the frame region; and a determination unit for determining light intensity in a position corresponding to each light emitting pixel of the backlight source depending on the estimated light intensity distribution in the display region.

Optionally, in the liquid crystal display provided by the embodiments of this disclosure, the first calculation unit is specifically used for: estimating light intensity distribution of the sub-regions along the first direction in the frame region according to formula $$f_k(x) = \sum_{i=1}^{n} a_{ki} x^{n-i},$$

wherein k=1 or 2, $f_1(x)$ indicates light intensity of the first sub-region in a position x along the first direction, coefficient $a_{1i}$ being calculated by substituting positions and light intensities of the n photosensitive detectors in the first sub-region into formula $$f_1(x) = \sum_{i=1}^{n} a_{1i} x^{n-i},$$

and $f_2(x)$ indicates light intensity of the second sub-region in the position x along the first direction, coefficient $a_{2i}$ being calculated by substituting positions and light intensities of the n photosensitive detectors in the second sub-region into formula $$f_2(x) = \sum_{i=1}^{n} a_{2i} x^{n-i};$$

and estimating light intensity distribution of the sub-regions along the second direction in the frame region according to formula $$f_k(y) = \sum_{i=1}^{n} b_{ki} y^{n-i},$$

wherein k=1 or 2, $f_1(y)$ indicates light intensity of the third sub-region in a position y along the second direction, coefficient $b_{1i}$ being calculated by substituting positions and light intensities of the n photosensitive detectors in the third sub-region into formula $$f_1(y) = \sum_{i=1}^{n} b_{1i} y^{n-i},$$

and $f_2(y)$ indicates light intensity of the fourth sub-region in the position y along the second direction, coefficient $b_{2i}$ being calculated by substituting positions and light intensities of the n photosensitive detectors in the fourth sub-region into formula $$f_2(y) = \sum_{i=1}^{n} b_{2i} y^{n-i}.$$

It should be noted that, in the liquid crystal display provided by the embodiments of this disclosure, the first sub-region and the second sub-region share a same positional reference coordinate system, i.e., the first sub-region and the second sub-region share a same reference origin along the first direction. The third sub-region and the fourth sub-region share a same positional reference coordinate system, i.e., the third sub-region and the fourth sub-region share a same reference origin along the second direction.

Optionally, in the liquid crystal display provided by the embodiments of this disclosure, the second calculation unit is specifically used for: estimating light intensity distribution in the display region according to a set of formulas as follows based on the light intensity distribution of each sub-region in the frame region:

$$f(x, y) = \mu f(x) + (1 - \mu) f(y)$$

$$f(y) = \frac{d_1}{d} f_1(y) + \frac{d_2}{d} f_2(y)$$

$$f(x) = \frac{l_1}{l} f_1(x) + \frac{l_2}{l} f_2(x)$$

$$\text{when } a < b, \mu = \frac{1}{2} e^{(a-b)}$$

$$\text{when } a > b, \mu = 1 - \frac{1}{2} e^{(b-a)}$$

wherein, d indicates a width of the display region along the first direction, $d_1$ indicates a distance from the position x along the first direction to the third sub-region, $d_2$ indicates a distance from the position x along the first direction to the fourth sub-region, l indicates a width of the display region along the second direction, $l_1$ indicates a distance from the position y along the second direction to the first sub-region, $l_2$ indicates a distance from the position y along the second direction to the second sub-region, a indicates the greater of $a_{11}$ and $a_{21}$, and b indicates the greater of $b_{11}$ and $b_{21}$.

Optionally, in the liquid crystal display provided by the embodiments of this disclosure, as shown in FIG. 2, each sub-region is distributed with three photosensitive detectors 01.

Figure 3:
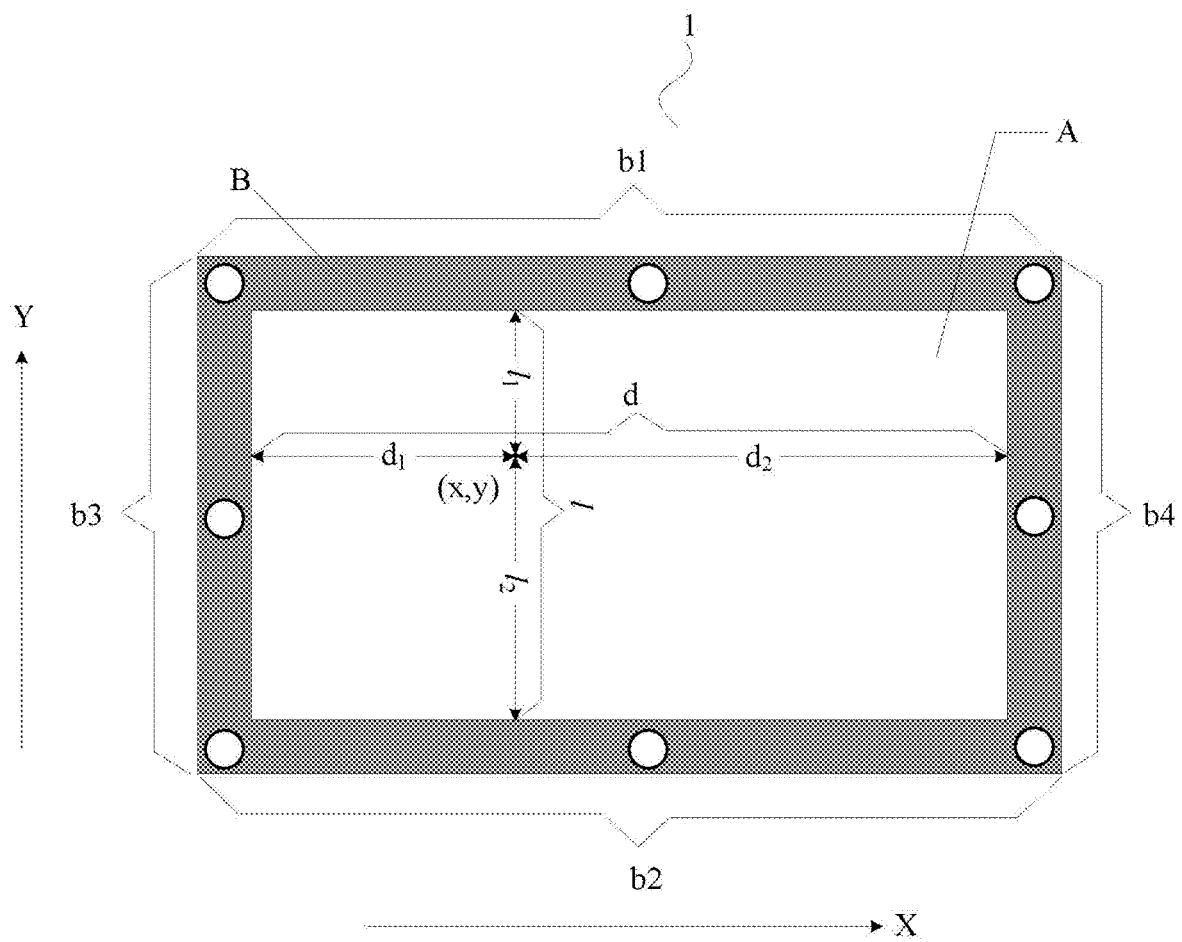
FIG. 3 is a schematic distribution view of photosensitive detectors in a liquid crystal display panel provided by the embodiments of this disclosure.

Optionally, in the liquid crystal display provided by the embodiments of this disclosure, as shown in FIG. 3, the three photosensitive detectors 01 in each sub-region are located respectively on both ends and in the middle of the sub-region. In this way, adjacent sub-regions can share a photosensitive detector, and thus the liquid crystal display can be provided with at least 8 photosensitive detectors 01.

The operation principle of the liquid crystal display provided by the embodiments of this disclosure will be explained as follows with a specific example.

As shown in FIG. 3, each sub-region of the frame region B in the liquid crystal display panel 1 is provided with 3 photosensitive detectors 01. Assuming positions of the three photosensitive detectors 01 in the first sub-region b1 are respectively $x_1$, $x_2$ and $x_3$, and the corresponding light intensities are respectively $I_1$, $I_2$ and $I_3$; positions of the three photosensitive detectors 01 in the second sub-region b2 are respectively $x_4$, $x_5$ and $x_6$, and the corresponding light intensities are respectively $I_4$, $I_5$ and $I_6$; positions of the three photosensitive detectors 01 in the third sub-region b3 are respectively $y_1$, $y_2$ and $y_3$, and the corresponding light intensities are respectively $P_1$, $P_2$ and $P_3$; and positions of the three photosensitive detectors 01 in the fourth sub-region b4 are respectively $y_4$, $y_5$ and $y_6$, and the corresponding light intensities are respectively $P_4$, $P_5$ and $P_6$.

The first calculation unit estimates light intensity of the first sub-region b1 in the position x along the first direction according to formula (1). Specifically, $a_{11}$, $a_{12}$ and $a_{13}$ are calculated by substituting $x_1$, $x_2$ and $x_3$, as well as the corresponding light intensities $I_1$, $I_2$ and $I_3$ into formula (1), i.e., from a set of formulas (2).

$$f_1(x) = \sum_{i=1}^{3} a_{1i} x^{3-i} = a_{11} x^2 + a_{12} x + a_{13} \quad (1)$$

$$\begin{cases} I_1 = a_{11} x_1^2 + a_{12} x_1 + a_{13} \\ I_2 = a_{11} x_2^2 + a_{12} x_2 + a_{13} \\ I_3 = a_{11} x_3^2 + a_{12} x_3 + a_{13} \end{cases} \quad (2)$$

In a similar way, the first calculation unit estimates light intensity of the second sub-region b2 in the position x along the first direction according to formula (3). Specifically, $a_{21}$, $a_{22}$ and $a_{23}$ are calculated by substituting $x_4$, $x_5$ and $x_6$, as well as the corresponding light intensities $I_4$, $I_5$ and $I_6$ into formula (3), i.e., from a set of formulas (4).

$$f_2(x) = \sum_{i=1}^{3} a_{2i} x^{3-i} = a_{21} x^2 + a_{22} x + a_{23} \quad (3)$$

$$\begin{cases} I_4 = a_{21} x_4^2 + a_{22} x_4 + a_{23} \\ I_5 = a_{21} x_5^2 + a_{22} x_5 + a_{23} \\ I_6 = a_{21} x_6^2 + a_{22} x_6 + a_{23} \end{cases} \quad (4)$$

In a similar way, the first calculation unit estimates light intensity of the third sub-region b3 in the position y along the second direction according to formula (5). Specifically, $b_{11}$, $b_{12}$ and $b_{13}$ are calculated by substituting $y_1$, $y_2$ and $y_3$, as well as the corresponding light intensities $P_1$, $P_2$ and $P_3$ into formula (5), i.e., from a set of formulas (6).

$$f_1(y) = \sum_{i=1}^{3} b_{1i} y^{3-i} = b_{11} y^2 + b_{12} y + b_{13} \quad (5)$$

$$\begin{cases} P_1 = b_{11}y_1^2 + b_{12}y_1 + b_{13} \\ P_2 = b_{11}y_2^2 + b_{12}y_2 + b_{13} \\ P_3 = b_{11}y_3^2 + b_{12}y_3 + b_{13} \end{cases} \quad (6)$$

In a similar way, the first calculation unit estimates light intensity of the fourth sub-region b4 in the position y along the second direction according to formula (7). Specifically, $b_{21}$, $b_{22}$ and $b_{23}$ are calculated by substituting $y_4$, $y_5$ and $y_6$, as well as the corresponding light intensities $P_4$, $P_5$ and $P_6$ into formula (7), i.e., from a set of formulas (8).

$$f_2(y) = \sum_{i=1}^{3} b_{2i} y^{3-i} = b_{21} y^2 + b_{22} y + b_{23} \quad (7)$$

$$\begin{cases} P_4 = b_{21}y_4^2 + b_{22}y_4 + b_{23} \\ P_5 = b_{21}y_5^2 + b_{22}y_5 + b_{23} \\ P_6 = b_{21}y_6^2 + b_{22}y_6 + b_{23} \end{cases} \quad (8)$$

The second calculation unit then estimates light intensity distribution in the display region from a set of formulas (9) as follows based on the calculation results of formulas (1), (3), (5) and (7).

$$f(x, y) = \mu f(x) + (1 - \mu) f(y) \quad (9)$$

$$f(y) = \frac{d_1}{d} f_1(y) + \frac{d_2}{d} f_2(y)$$

$$f(x) = \frac{l_1}{l} f_1(x) + \frac{l_2}{l} f_2(x)$$

$$\text{when } a < b, \mu = \frac{1}{2} e^{(a-b)}$$

$$\text{when } a > b, \mu = 1 - \frac{1}{2} e^{(b-a)}$$

If $a_{11} < a_{21}$, $a = a_{21}$; and if $a_{11} \geq a_{21}$, $a = a_{11}$. If $b_{11} \geq b_{21}$, $b = b_{11}$; and if $b_{11} < b_{21}$, $b = b_{21}$. d indicates a width of the display region A along the first direction X, $d_1$ indicates a distance from the position x along the first direction X to the third sub-region b3, and $d_2$ indicates a distance from the position x along the first direction X to the fourth sub-region b4. l indicates a width of the display region A along the second direction Y, $l_1$ indicates a distance from the position y along the second direction Y to the first sub-region b1, and $l_2$ indicates a distance from the position y along the second direction Y to the second sub-region b2.

After that, the second calculation unit estimates light intensity distribution f(x, y) in the display region A from the above formulas. Then, the determination unit determines light intensity in a position corresponding to each light emitting pixel of the backlight source depending on the estimated light intensity distribution f(x, y) in the display region A. The backlight driving circuit then, based on the determined light intensity in a position corresponding to each light emitting pixel of the backlight source, adjusts luminance of the light emitting pixel in this corresponding position. In this way, adjustment to luminance distribution of the backlight source based on the light intensity distribution in the display region is achieved.

Based on a same inventive concept, the embodiments of this disclosure further provide a display device, comprising any of the liquid crystal displays provided by the embodiments of this disclosure. The display device can be any product or component having a display function, such as a handset, a tablet computer, a television, a display, a notebook computer, a digital photo frame, a navigator and the like. Embodiments of the above liquid crystal display can be referred to for implementation of the display device, and repetitive portions will not be described for simplicity.

In the liquid crystal display and the display device provided by the embodiments of this disclosure, a plurality of photosensitive detectors are arranged in the frame region of the liquid crystal display panel, Light intensity distribution in the display region is estimated by a light intensity estimation module based on the light intensity detected by each photosensitive detector, Light intensity in a position corresponding to each light emitting pixel of the backlight source is determined based on the light intensity distribution in the display region estimated by the light intensity estimation module. Depending on the determined light intensity in a position corresponding to each light emitting pixel of the backlight source, luminance of the light emitting pixel in this corresponding position is controlled by a backlight driving circuit. In this way, when the ambient light irradiates onto the liquid crystal display panel with different intensities, even if the light intensities received by each zone of the display region are different, the backlight driving circuit can adjust luminance distribution of the backlight source based on the light intensity distribution of the display region, thereby reducing influence of the ambient light on the display effect.

Obviously, those skilled in the art can make various modifications and variations to this disclosure without deviating from the spirits and scopes of this disclosure. Thus if the modifications and variations to this disclosure fall within the scopes of the claims of this disclosure and the equivalent techniques thereof, this disclosure is intended to include them too.

The invention claimed is:

1. A liquid crystal display, comprising:
    a liquid crystal display panel,
    a backlight source provided with a plurality of light emitting pixels arranged in a matrix, and
    a backlight driving circuit for driving the backlight source to emit light;
    wherein the liquid crystal display panel comprises a display region and a frame region surrounding the display region,
    wherein the liquid crystal display further comprises: a plurality of photosensitive detectors located in the frame region and a light intensity estimation module,
    wherein the photosensitive detectors are used for detecting light intensities of the ambient light in positions where they are located,
    wherein the light intensity estimation module is used for estimating light intensity distribution of the ambient light across the display region based on the light intensity of the ambient light detected by each of the photosensitive detectors, and determining light intensity of the ambient light in a position corresponding to each light emitting pixel of the backlight source based on the estimated light intensity distribution of the ambient light across the display region,
    wherein the backlight driving circuit is further used for, based on the determined light intensity of the ambient light in a position corresponding to each light emitting pixel of the backlight source, adjusting luminance of the light emitting pixel in this corresponding position, wherein the display region of the liquid crystal display panel is rectangular, and the frame region comprises a first sub-region and a second sub-region extending along a first direction, as well as a third sub-region and a fourth sub-region extending along a second direction, each sub-region being distributed with at least n photosensitive detectors, wherein n is an integer greater than 2, wherein the light intensity estimation module comprises: a first calculation unit for estimating light intensity distribution of the ambient light of a corresponding sub-region of the frame region based on light intensities of the ambient light and positions of the n photosensitive detectors in each sub-region of the frame region; a second calculation unit for estimating light intensity distribution of the ambient light across the display region based on the light intensity distribution of the ambient light of each sub-region of the frame region; and a determination unit for determining light intensity of the ambient light in a position corresponding to each light emitting pixel of the backlight source depending on the estimated light intensity distribution of the ambient light across the display region, and wherein the first calculation unit is used for:

estimating light intensity distribution of the ambient light of the sub-regions along the first direction in the frame region according to formula $$f_k(x) = \sum_{i=1}^{n} a_{ki} x^{n-i},$$

wherein k=1 or 2, $f_1(x)$ indicates light intensity of the ambient light of the first sub-region in a position x along the first direction, coefficient $a_{1i}$ being calculated by substituting light intensities of the ambient light and positions of the n photosensitive detectors in the first sub-region into formula $$f_1(x) = \sum_{i=1}^{n} a_{1i} x^{n-i},$$

and $f_2(x)$ indicates light intensity of the ambient light of the second sub-region in the position x along the first direction, coefficient $a_{2i}$ being calculated by substituting light intensities of the ambient light and positions of the n photosensitive detectors in the second sub-region into formula $$f_2(x) = \sum_{i=1}^{n} a_{2i} x^{n-i};$$

and estimating light intensity distribution of the ambient light of the sub-regions along the second direction in the frame region according to formula $$f_k(y) = \sum_{i=1}^{n} b_{ki} y^{n-i},$$

wherein k=1 or 2, $f_1(y)$ indicates light intensity of the ambient light of the third sub-region in a position y along the second direction, coefficient $b_{1i}$ being calculated by substituting light intensities of the ambient light and positions of the n photosensitive detectors in the third sub-region into formula $$f_1(y) = \sum_{i=1}^{n} b_{1i} y^{n-i},$$

and $f_2(y)$ indicates light intensity of the ambient light of the fourth sub-region in the position y along the second direction, coefficient $b_{2i}$ being calculated by substituting light intensities of the ambient light and positions of the n photosensitive detectors in the fourth sub-region into formula $$f_2(y) = \sum_{i=1}^{n} b_{2i} y^{n-i}.$$

2. The liquid crystal display according to claim 1, wherein the light intensity estimation module is connected between each of the photosensitive detectors and the backlight driving circuit.

3. The liquid crystal display according to claim 1, wherein the backlight driving circuit is used for:
comparing the light intensity of the ambient light in a position corresponding to each light emitting pixel of the backlight source in the display region with a first light intensity threshold; and
if the light intensity of the ambient light in a position corresponding to the light emitting pixel is greater than the first light intensity threshold, increasing the luminance of the light emitting pixel in this corresponding position.

4. The liquid crystal display according to claim 3, wherein the backlight driving circuit is further used for:
comparing the light intensity of the ambient light in a position corresponding to each light emitting pixel of the backlight source in the display region with a second light intensity threshold, wherein the second light intensity threshold is smaller than the first light intensity threshold; and
if the light intensity of the ambient light in a position corresponding to the light emitting pixel is smaller than the second light intensity threshold, decreasing the luminance of the light emitting pixel in this corresponding position.

5. The liquid crystal display according to claim 1, wherein the second calculation unit is used for: estimating light intensity distribution of the ambient light across the display region according to a set of formulas as follows based on the light intensity distribution of the ambient light of each sub-region in the frame region:

$$f(x, y) = \mu f(x) + (1 - \mu) f(y)$$

$$f(y) = \frac{d_1}{d} f_1(y) + \frac{d_2}{d} f_2(y)$$

$$f(x) = \frac{l_1}{l} f_1(x) + \frac{l_2}{l} f_2(x)$$

when $a < b$, $\mu = \frac{1}{2} e^{(a-b)}$

-continued $$\text{when } a > b, \mu = 1 - \frac{1}{2}e^{(b-a)}$$

wherein, d indicates a width of the display region along the first direction, $d_1$ indicates a distance from the position x along the first direction to the third sub-region, $d_2$ indicates a distance from the position x along the first direction to the fourth sub-region, l indicates a width of the display region along the second direction, $l_1$ indicates a distance from the position y along the second direction to the first sub-region, $l_2$ indicates a distance from the position y along the second direction to the second sub-region, a indicates the greater of $a_{11}$ and $a_{21}$, and b indicates the greater of $b_{11}$ and $b_{21}$.

6. The liquid crystal display according to claim 5, wherein each sub-region is distributed with three photosensitive detectors.

7. The liquid crystal display according to claim 6, wherein the three photosensitive detectors in each sub-region are located respectively on both ends and in the middle of the sub-region.

8. A display device comprising the liquid crystal display according to claim 1.

9. The display device according to claim 8, wherein the light intensity estimation module is connected between each of the photosensitive detectors and the backlight driving circuit.

10. The display device according to claim 8, wherein the backlight driving circuit is used for:
comparing the light intensity of the ambient light in a position corresponding to each light emitting pixel of the backlight source in the display region with a first light intensity threshold; and
if the light intensity of the ambient light in a position corresponding to the light emitting pixel is greater than the first light intensity threshold, increasing the luminance of the light emitting pixel in this corresponding position.

11. The display device according to claim 10, wherein the backlight driving circuit is further used for:
comparing the light intensity of the ambient light in a position corresponding to each light emitting pixel of the backlight source in the display region with a second light intensity threshold, wherein the second light intensity threshold is smaller than the first light intensity threshold; and
if the light intensity of the ambient light in a position corresponding to the light emitting pixel is smaller than the second light intensity threshold, decreasing the luminance of the light emitting pixel in this corresponding position.

12. The display device according to claim 8, wherein the second calculation unit is used for: estimating light intensity distribution of the ambient light across the display region according to a set of formulas as follows based on the light intensity distribution of the ambient light of each sub-region in the frame region:

$$f(x, y) = \mu f(x) + (1 - \mu) f(y)$$

$$f(y) = \frac{d_1}{d} f_1(y) + \frac{d_2}{d} f_2(y)$$

$$f(x) = \frac{l_1}{l} f_1(x) + \frac{l_2}{l} f_2(x)$$

$$\text{when } a < b, \mu = \frac{1}{2}e^{(a-b)}$$

$$\text{when } a > b, \mu = 1 - \frac{1}{2}e^{(b-a)}$$

wherein, d indicates a width of the display region along the first direction, $d_1$ indicates a distance from the position x along the first direction to the third sub-region, $d_2$ indicates a distance from the position x along the first direction to the fourth sub-region, l indicates a width of the display region along the second direction, $l_1$ indicates a distance from the position y along the second direction to the first sub-region, $l_2$ indicates a distance from the position y along the second direction to the second sub-region, a indicates the greater of $a_{11}$ and $a_{21}$, and b indicates the greater of $b_{11}$ and $b_{21}$.

13. The display device according to claim 12, wherein each sub-region is distributed with three photosensitive detectors.

14. The display device according to claim 13, wherein the three photosensitive detectors in each sub-region are located respectively on both ends and in the middle of the sub-region.

* * * * *